(No Model.)
A. DE MÉRITENS.
ELECTRICALLY WELDING METALS.
No. 471,242. Patented Mar. 22, 1892.
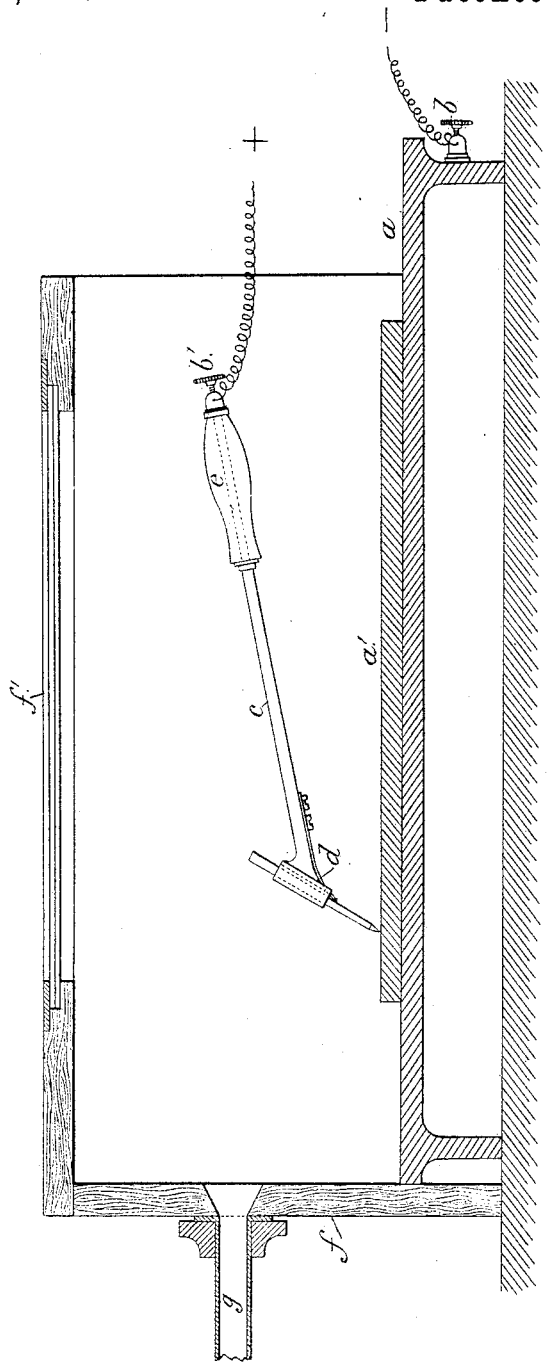
Witnesses
Francis Mennons Junior.
Albert Batteault
Inventor

UNITED STATES PATENT OFFICE.

AUGUSTE DE MÉRITENS, OF PARIS, FRANCE, ASSIGNOR, BY MESNE ASSIGNMENTS, TO THE THOMSON ELECTRIC WELDING COMPANY, OF BOSTON, MASSACHUSETTS.

ELECTRICALLY WELDING METALS.

SPECIFICATION forming part of Letters Patent No. 471,242, dated March 22, 1892.

Application filed November 8, 1887. Serial No. 254,585. (No specimens.) Patented in France November 24, 1881, No. 146,010.

*To all whom it may concern:*

Be it known that I, AUGUSTE DE MÉRITENS, electrical engineer, a citizen of the French Republic, residing at Paris, in France, have invented certain new and useful Improvements in Welding or Soldering Metals, (for which I have received Letters Patent in France, No. 146,010, dated November 24, 1881;) and I do hereby declare that the following is a full, clear, and exact description of the invention, which will enable others skilled in the art to which it appertains to make and use the same, reference being had to the accompanying drawing, which represents in partial longitudinal vertical section and in side elevation an example of the apparatus which may be used in the execution thereof.

The object of my invention is to effect by means of electricity the welding or soldering of two pieces of metal for the purpose of uniting the same; and it consists in applying to the points of junction thereof a voltaic arc produced by any suitable electrical generator of sufficient power to fuse the metals to the required extent.

In the accompanying drawing, $a$ represents a cast-iron slab connected by the binding-screw $b$ with the negative pole of the battery and supporting the articles $a'$ to be welded or soldered together.

$c$ is a soldering-tool connected with the positive pole of the same. This soldering-tool may be composed of a copper or other suitable metallic stock, in which a carbon rod is secured by a spring $d$ and provided with an insulating-handle $e$. The positive binding-screw $b'$ connects with the metallic portions of the carbon-holder.

The slab $a$ is incased by a hood $f$, provided with a glass covering $f'$ of complementary colors to protect the eyes of the operator and leaving a free space for the passage and manipulation of the soldering-tool. A ventilating device, as in $g$, may be adapted to the casing to carry off any volatile particles which may be disengaged when operating on certain metals and alloys.

The connections being established as above and the ventilating device set in action, (when required,) the free end of the carbon rod is applied to the starting-point of the line to be soldered or welded. The electric current is then completed, and the voltaic arc is produced by a slight upward motion of the operator's hand. The fusion of the metal takes place more or less rapidly, according to the nature of the latter and the power of the current, and is followed up by a progressive movement of the soldering device till the end of the line is attained. The depth of the welding may be regulated at will by holding the tool at greater or less distance from the surface operated on.

The weldings effected as above are perfectly homogeneous and can by their physical character be easily distinguished from all others hitherto known.

Having now fully described my invention, what I desire to claim and secure by Letters Patent is—

1. The herein-described art or process of joining two pieces of metal together by a welding or soldering operation, consisting in forming an electric arc at those points only of the metal which are to be joined, the heating-current being adjusted at said point to the required welding or soldering temperature.

2. The herein-described process of joining metals by means of the directly-applied electric current, which consists in forming the voltaic arc along the desired line of junction by a conductor forming one pole, while the metal forms the opposite pole in proximity to the first.

AUGUSTE DE MÉRITENS.

Witnesses:
 FRANCIS MENNONS, Jr.,
 ALBERT BATTEAULT,
  *Clerks to Mennons & Co., Paris.*